Patented May 8, 1951

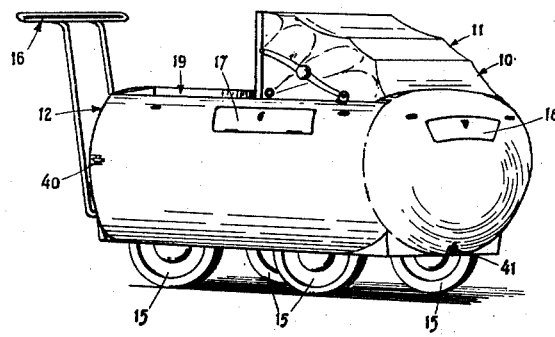
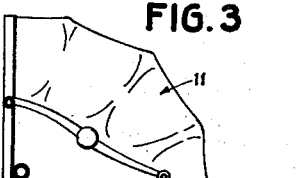
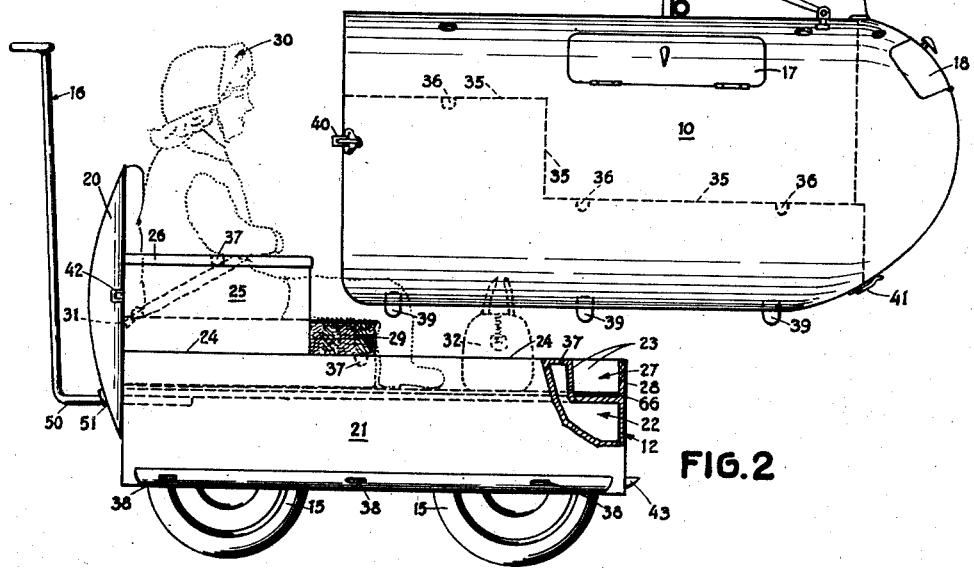

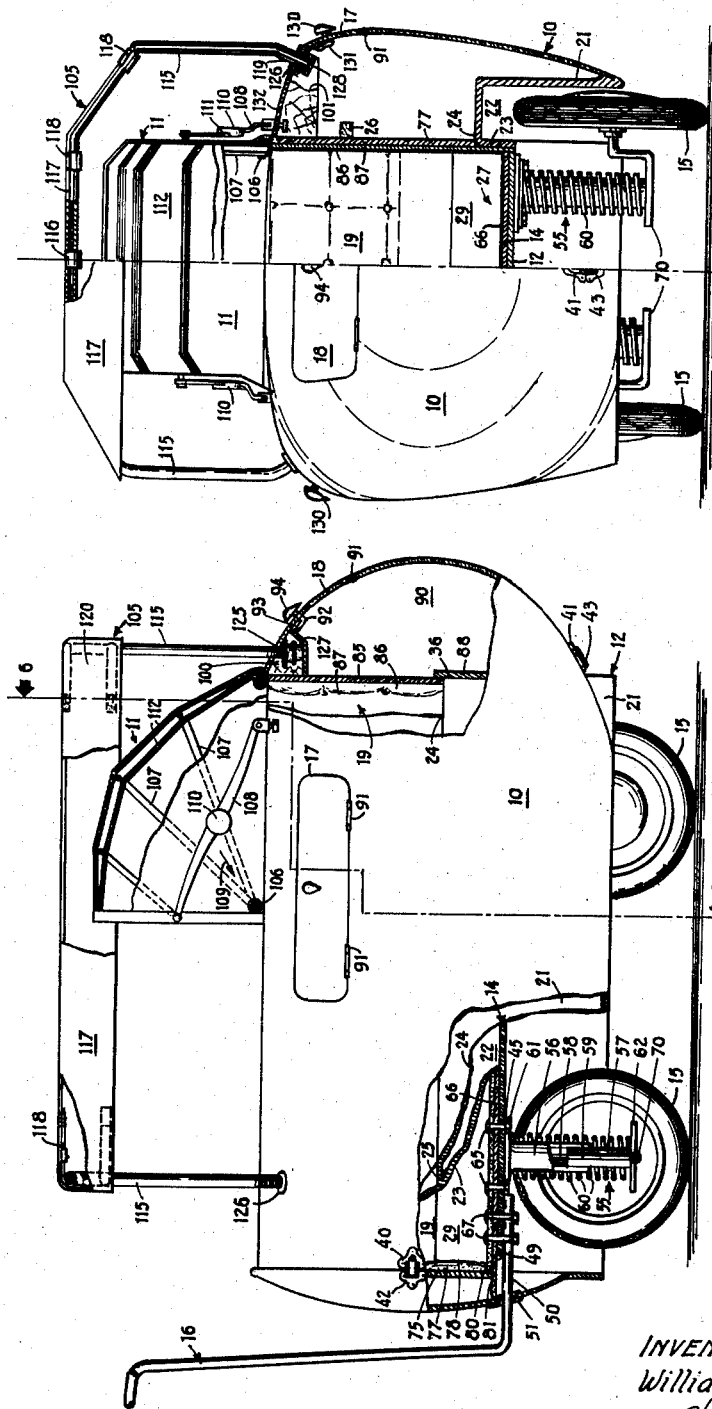

2,552,453

UNITED STATES PATENT OFFICE 2,552,453

HAND WHEELED LAND VEHICLE

William Pintar, Antwerp, Belgium, assignor of one-half to Rolland Raymond Rork, North Vernon, Ind.

Application February 13, 1948, Serial No. 8,172

4 Claims. (Cl. 296—28)

This invention relates to a perambulator for carrying a child and parcels. More particularly, it deals with a combination baby carriage and stroller or wheel-chair for a child, having facilities for carrying parcels such as those accumulated while the guardian of the vehicle and child is shopping.

An object of this invention is to produce a new light, strong, economical, roomy, comfortable, easy riding, safe, infant carrying vehicle which may be used over a comparatively long period of a child's infancy up until the child is able to walk considerable distances.

Another object is to produce an infant carrying vehicle which may be easily changed from a baby carriage into a stroller or vice-versa and includes sufficient room for the carrying of parcels.

Another object is to produce a plastic streamlined infant carrying vehicle with individually resiliently mounted wheels and with a demountable and portable sun top.

In accordance with this invention the convertible perambulator comprises a rigid flat horizontal base frame, preferably made out of light strong metal, to which separately resiliently mounted wheels are attached and a pushing handle. Upon this base frame is mounted a lower body portion in the form of a child's chair and to this lower body portion a streamlined front-and-side portion is removably attached.

The base frame preferably is rectangular in shape and has a wheel mounted at each corner, each suspended on a helical spring guided by a tongued and grooved telescopic cylinder. On the lower cylinder of each is mounted an upwardly extending goose-neck carrying the axle for the wheel.

The outside of the lower body portion is preferably made of plastic which may be moulded from a powder or from a sheet of plastic material, and comprises an outer convex back wall and parallel pockets and skirts along each side of the base frame for the wheels. The inside wall of the upwardly extending back is preferably made of plywood covered with a layer of cushioning material covered with a waterproof material. The lower body portion also comprises partial side walls extending partly the length of the vehicle and providing armrests for the chair assembly of which the back wall forms a seat back. The pusher handle extends from the base frame outwardly and upwardly behind this back portion. The interior bottom of the vehicle between the parallel pockets for the wheels is preferably provided with a mattress which is foldable at its center, so that it may be made of double thickness at the chair assembly end to form the seat portion for said chair.

The outside of the upper, or front-and-sides body portion, is preferably also made of plastic and streamlined with convex exterior walls which extend down to the lower edge of said lower body portion. Its inside walls may be made of plywood covered with a cushioning material with a waterproof outside covering. Between the convex walls of this upper portion and the inner plywood walls is a space which may be used as a parcel carrying compartment, and access into which may be through doors placed in the top exterior convex plastic walls. Over the top of this upper body portion there may be provided the commonly known type of sunshade and also an additional canopy mounted on a collapsible frame which may be readily demounted and stored in one of the parcel carrying compartments.

The above mentioned and other features and objects of this invention and the manner of attaining them will become more apparent and the invention itself will be best understood by reference to the following description of an embodiment of the invention taken in connection with the accompanying drawings, wherein:

Fig. 1 is a perspective view of the perambulator of this invention employed as a baby carriage.

Fig. 2 is a side view, with a corner broken away, of the perambulator shown in Fig. 1 when employed as a stroller.

Fig. 3 is a side view of the upper body portion of the perambulator which fits on top of the lower portion shown in Fig. 2, to convert the stroller shown in Fig. 2 into a baby carriage as shown in Fig. 1.

Fig. 4 is a bottom view of the perambulator in Fig. 2 showing the base frame.

Fig. 5 is a detailed side view of the perambulator shown in Fig. 1 with parts broken away.

Fig. 6 is a front view of the perambulator half in section taken along line 6—6 in Fig. 5.

Referring to Fig. 1, the perspective view of the perambulator as a baby carriage shows the upper or front-and-side body portion 10, with the conventional collapsible top 11, mounted against the lower or back-and-base body portion 12, which in turn is mounted on the base frame 14 (invisible in this figure but shown in Fig. 4). To this frame are mounted the wheels 15 and the pushing handle 16. In the sides as well as in the front of the convex streamlined body portion 10 may be provided doors 17 and 18 which open into one or more parcel storage compartments, between the straight inner walls forming the baby carrying compartment 19 and the outer convex walls shown.

In Fig. 2 there is shown in side elevation the perambulator of Fig. 1 with the streamlined upper body portion 10, together with its sun top 11, removed (and only shown in Fig. 3). Fig. 2 shows the integral back 20 with the lower body portion 12 and the skirts 21 which form pockets 22 (see also Fig. 4) for the wheels 15. These pockets 22 comprise partial upwardly extending interior sides 23 with outwardly extending tops or shelves 24, before extending downwardly to form the skirts 21. In addition, the interior sides 23 extend upwardly above the shelves 24 adjacent the back 20 to form armrests 25 for the chair assembly and may have widened outwardly extending top surfaces 26 for the arms. These armrests 25 and sides 23 aid in maintaining and supporting the back 20 of the chair assembly. The sides 23 also form a bottom compartment 27 in the portion 12 closed at the back by the back portion 20 and at the front by the wall 28. This compartment 27 is of sufficient depth to maintain a mattress 29 which is divided into two or more parts so it may be doubled back on itself or folded together, to form the seat of the chair assembly between the armrests 25.

To clarify the formation of the chair in Fig. 2, there is shown, in dotted lines, a child sitting on the double thickness of mattress 29 and the child may be held in position by a strap 31 (shown in dotted lines) which may be attached to the back 20 or armrests 25. From this view there is sufficient room in front of the child's feet for the carrying of parcels (shown dotted at 32) which are retained from sliding out of the carriage by the upwardly interior extending sides 23 and the end wall 28.

Referring to the streamlined upper or side-and-front body portion 10 shown in Fig. 3, its interior wall is cut along the dotted line 35 to fit over the top interior edges of the armrests 26 and on the shelves 24. Along the lower edge 35 of this wall, there may be provided downwardly extending pegs 36 which fit into holes 37 in the body portion 12 for holding the portion 10 in place thereon. Similar holes 38 may be provided along the bottom outside edge of the skirt 21 to co-operate with pins 39 along the bottom edge of the outside convex wall of the body portion 10. Further on each side at 40 and on the front bottom at 41, may be provided manual hook fasteners which co-operate with hooks 42 and 43, respectively, on the lower body portion 12, to clamp the streamlined portion 10 in position when the perambulator is to be used as a baby carriage. These clamp hooks may be of the type employed on suitcases which may readily be released when desired, but firmly hold the portions together when in use.

Referring to Fig. 4 which is a bottom view of the perambulator shown in Fig. 2, the base frame 14 is shown to comprise two steel or light metal plates 45 and 46 parallel and transverse of the carriage and reinforced by parallel and crossing strips 47 and 48, respectively. The back plate 45 may be provided with extensions 49 to which the ends 50 of the pushing handle 16 may be bolted or welded. These ends 50 extend through holes 51 in the lower portion of the convex wall of the back 20 and then extend upwardly and backwardly to form a pushing handle at the normal waist height above the ground.

This pushing handle member 16 may be formed of metal tubing and may be chromium plated if desired to improve its appearance. Instead of the open horizontal flat base frame 14, a solid metal plate may be employed, however, such a plate materially increases the weight of the vehicle. In the pockets 22 between the wheels 15, there are preferably provided reinforcing ribs 52 for the skirt sides 21.

At each end of the transverse plates 45 and 46, are mounted the individual resilient supports 55 for the preferably rubber tired wheels 15. These supports are more clearly seen in Fig. 5 and may comprise two telescopic cylinders 56 and 57 having respectively groove and tongue connections 58 and 59 to prevent their rotation. These cylinders may be surrounded by a normally extended helical spring 60, fixed at its ends to plates 61 and 62 respectively upon which the cylinders 56 and 57 are also fixedly mounted or welded. If desired, the helical spring 60 may be inside the telescopic cylinders 56 and 57 without departing from the scope of this invention. The upper plate 61 of the assembly 55 may be welded to the members 45 and 46, or they may be attached by bolts 65 which may also hold one end of the spring 60, the base frame 14 (or plate 45), the lower body portion 12, and also a reinforcing bottom 66, such as of plywood, for the bottom of compartment 19 and 27. The bolts 67 which fasten the ends 50 of handle 16 to the extensions 49, may extend through one or more of the lower body bottom portions as the bolts 65. The lower plate 62 of the wheel mounting assembly 55 is provided with an outwardly and upwardly extending goose-neck section 70 (see Fig. 6) upon which the axle and hub of wheel 15 are mounted. This upwardly extending goose-neck 70 enables the carriage to be supported closer to the ground, thereby lowering its center of gravity and decreasing the possibility of it being tipped over.

As shown at the left end broken away portion of Fig. 5, the walls of the baby carrying compartment 19 are substantially straight and vertical and may be composed of plywood boards 75, the interior side of which is provided with a cushioning material 77, such as a heavy layer of felt, to protect the infant from bumps, which cushion is preferably covered with a water-proof flexible material 78, such as oil cloth, plasticized fabric, or the like. Similarly, the front of the baby carrying compartment 19 on the upper body portion 10 has a vertical wall 85 of plywood with interior padding 86, covered with a suitable waterproof material 87.

In the front section in Fig. 5 at the point 36, the front wall 85 is offset to provide a lower extension 88 to reinforce the front of body portion 10 and also to act as a closure for the front luggage or parcel compartment space 90, accessible through the door 18. This door, as the doors 17 on the sides, may be provided with one or more hinges 91 at its lower edge, and a simple snap or other fastening means 92 at its upper edge which engages an extension 93 from the interior of the upper convex exterior wall of the body 10. The outside of the door 18 adjacent the fastening means 92 may carry a handle 94 by which the door may be opened.

Around the inside of the upper rim of the body portion 10 is preferably provided reinforcing strips or blocks 100 and 101, such as of wood, into which the supports for the collapsible shade 11, an additional sun-shade 105, may be rigidly anchored. The former shade 11 may comprise the known type of collapsible buggy shade which is pivoted at 106, is provided with radially extending ribs 107, and a toggle lever arrangement 108 which when bent in the direction of arrow 109 will cause all of the ribs of the shade 11 to fold down against the upper front rim of the body portion 10, and not extend out over the same. On the toggle lever 108 is provided a smooth limiting plate 110 with notches 111 (see Fig. 6) to prevent the toggles 108 from bending beyond the position shown in Fig. 5. All of the ribs of the hood 11 are covered on both sides with fabric 112 to prevent the infant's fingers from being caught and pinched by any of the ribs therein.

In Figs 5 and 6 there is shown an additional demountable canopy or sun shade 105 comprising two inverted U-shaped metallic ribs 115, each of which can be broken or pulled apart at its top center at 116 (or may be pivoted there if desired) so that they may be collapsed and stored in one of the side parcel carrying compartments in the upper body portion 10 through door 17. Over the top of these ribs 115 an additional fabric or the like sunshade 117 may be attached by means of elastically mounted hooks 118 to further shelter the baby carrying compartment 19. The ends 119 of arms 115 fit into holes 125 and 126 in the upper rim of body portion 10, below which are provided reinforcing sockets 127 and 128 which may be mounted in the previously mentioned blocks 100 and 101, respectively.

In Fig. 6 a different type of means 130 for latching the door 17 is shown, which comprises a pivoted handle with inwardly extending arm 131 which may be turned over the overhanging upper edge 132 of the convex side wall of body portion 10. Thus this type of means 130 may be used instead of type of means 92—94, if desired.

Although the present disclosure provides for plywood and plastic body parts, the whole device may be made of plywood or of plastic, as desired.

While there is described above the principals of this invention in connection with a specific embodiment, it is clearly understood that this description is made only by way of example and not as a limitation to the scope of this invention.

What is claimed is:

1. In a hand wheeled land vehicle for carrying a child and parcels having a base frame, wheels mounted on said frame and a pushing or pulling handle connected to said frame, the improvement comprising: a lower body portion mounted on said frame and having a horizontal floor, upwardly extending walls around said floor to form a tray-shaped compartment for a mattress, outwardly and downwardly extending skirts extending a substantial distance below said floor along opposite sides of said tray-shaped compartment whereby said skirts form parallel channels covering at least half the outside faces of the wheels of said vehicle, and an upright back and wall extending above said tray walls to form the back of a chair assembly; and an upper body portion having two parallel side members and a front member connecting adjacent ends of said side members, each of said side members comprising two substantially spaced side walls between which parcels may be carried, said side members resting along said tray walls of said lower body portion, and said front member overlapping the front of said lower body portion.

2. The vehicle of claim 1 including aligning pins and clamping means at the contacting edges of said upper and lower body portions whereby said upper body portion may be detached from said lower body portion to form a stroller of said lower body portion.

3. The vehicle of claim 1 wherein said chair assembly includes arm rests connected to said vertical back wall of said lower body portion.

4. The vehicle of claim 1 wherein said upper body portion comprises vertical interior side walls and convex exterior side walls having an aperture to provide a parcel carrying chamber between said interior and exterior side walls.

WILLIAM PINTAR.

REFERENCES CITED

The following references are of record in the file of this patent:

UNITED STATES PATENTS

| Number | Name | Date |
|---|---|---|
| 44,936 | Clapp | Nov. 8, 1864 |
| 210,266 | Pfeffer | Nov. 26, 1878 |
| 1,170,265 | Hudry | Feb. 1, 1916 |
| 1,245,339 | Headley | Nov. 6, 1917 |
| 1,662,292 | Bender | Mar. 13, 1928 |
| 1,729,055 | Specter | Sept. 24, 1929 |
| 2,055,890 | Berry | Sept. 29, 1936 |

FOREIGN PATENTS

| Number | Country | Date |
|---|---|---|
| 18,037 | Great Britain of 1891 | Apr. 30, 1892 |
| 161,485 | Great Britain | Apr. 14, 1921 |
| 168,538 | Great Britain | Sept. 8, 1921 |
| 811,174 | France | Jan. 14, 1937 |
| 373,160 | Italy | July 20, 1939 |